Patented Nov. 8, 1932

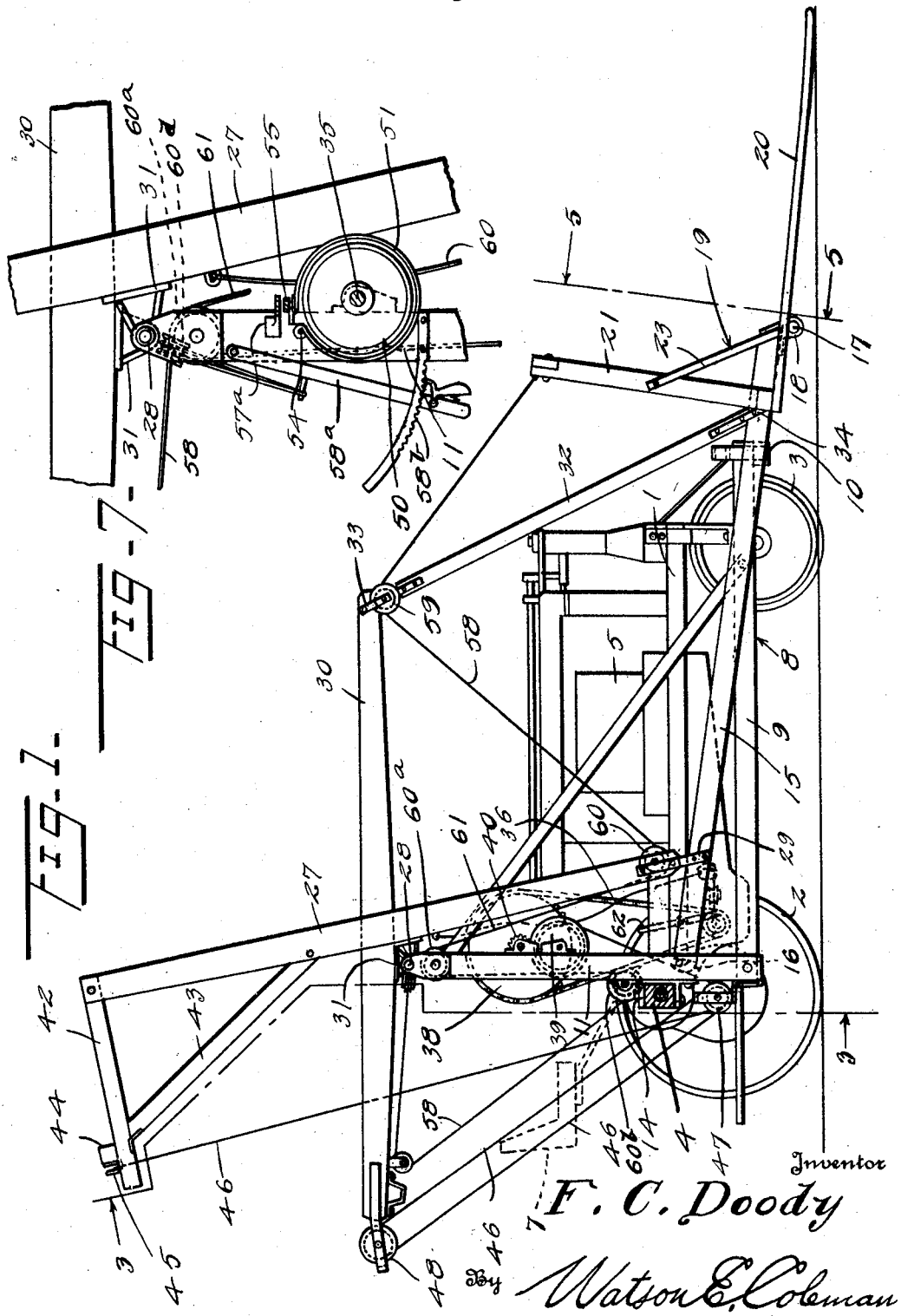

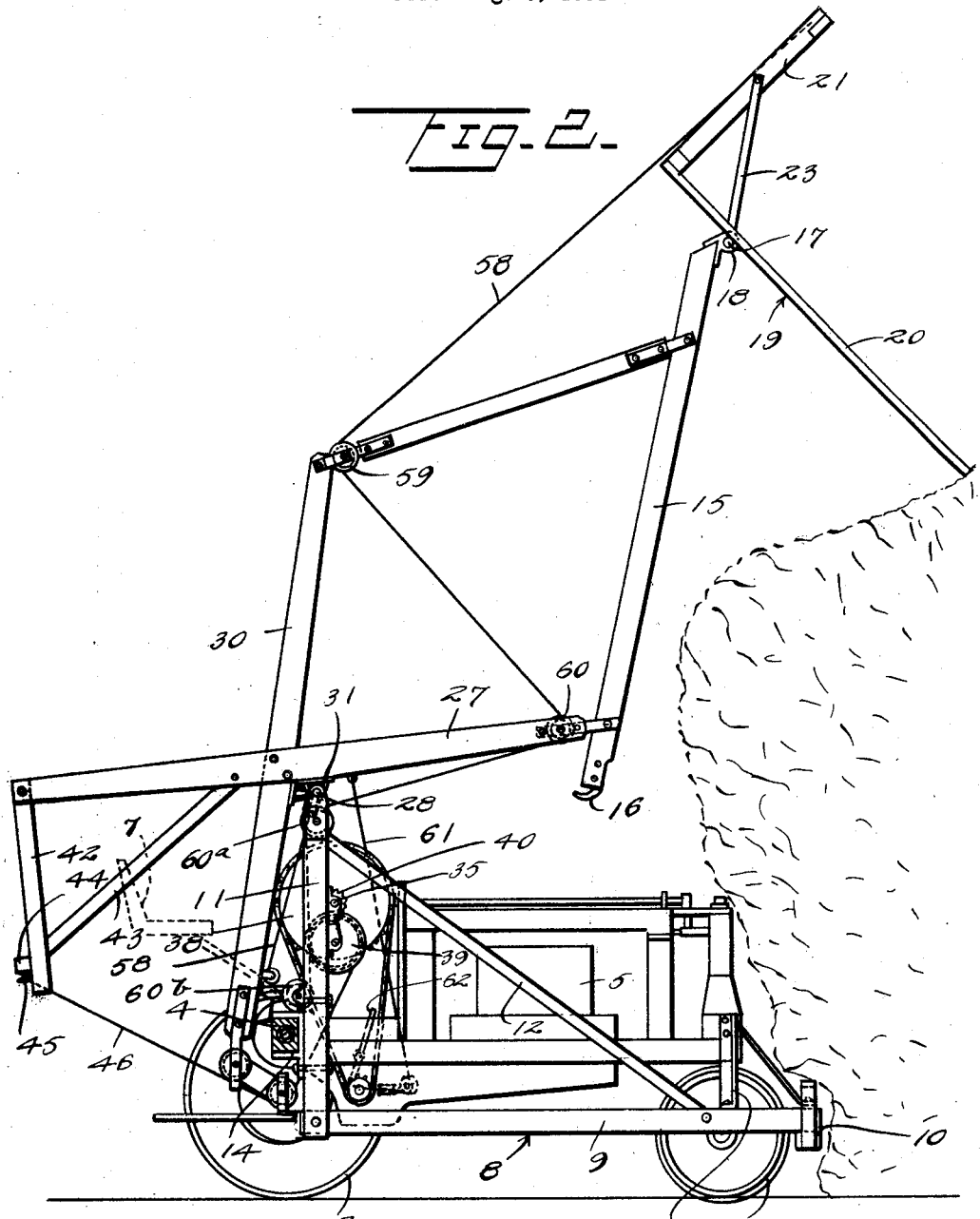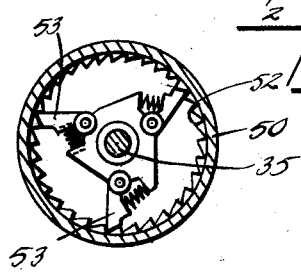

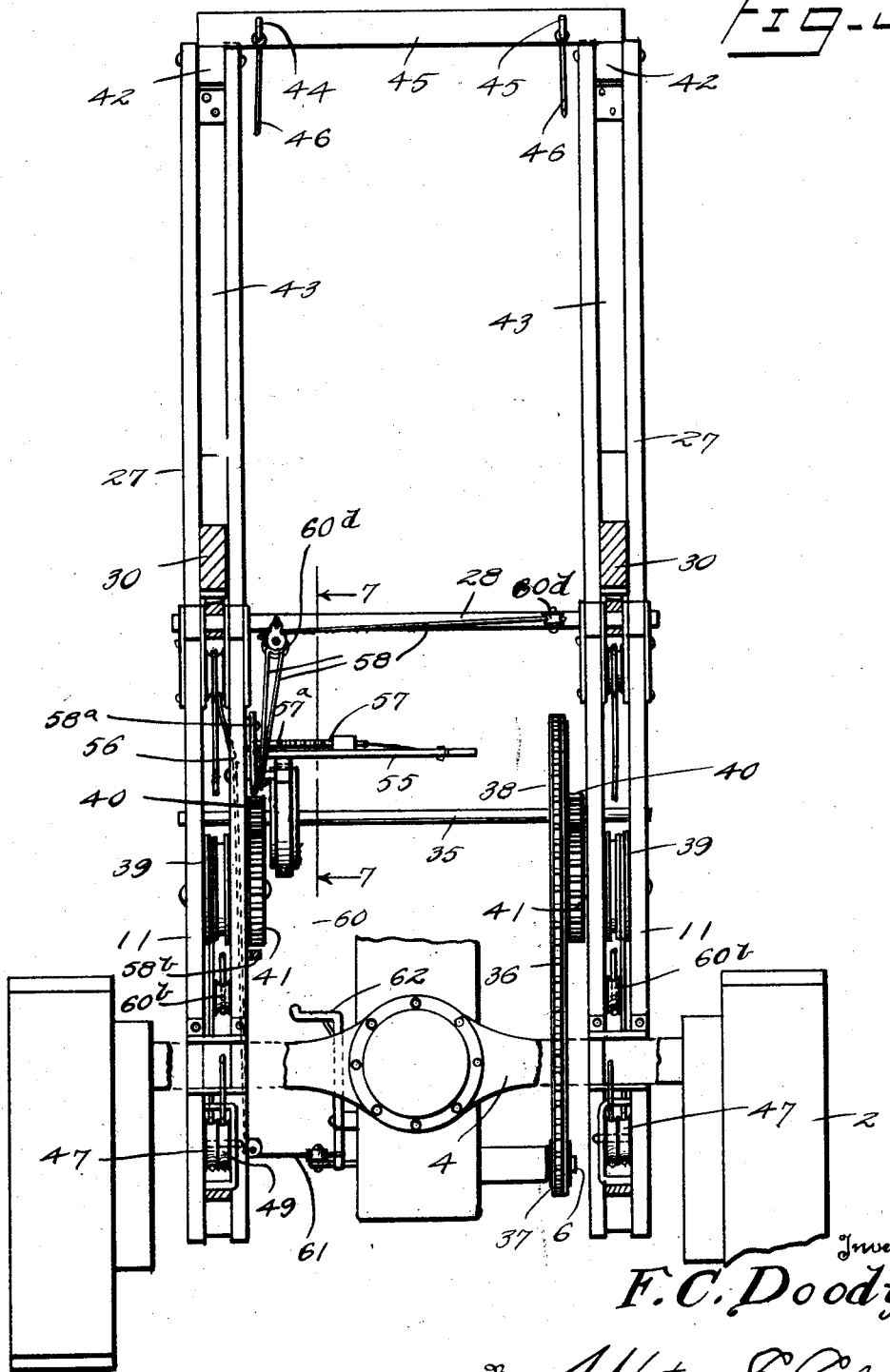

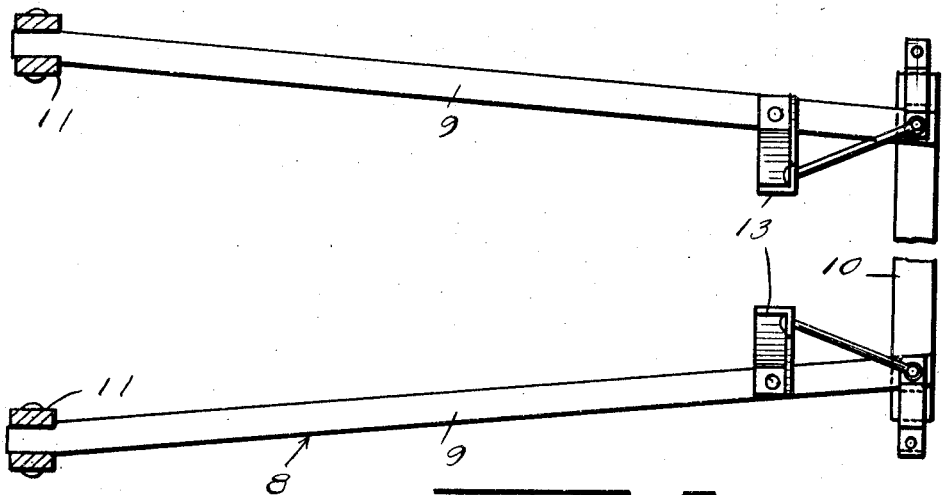
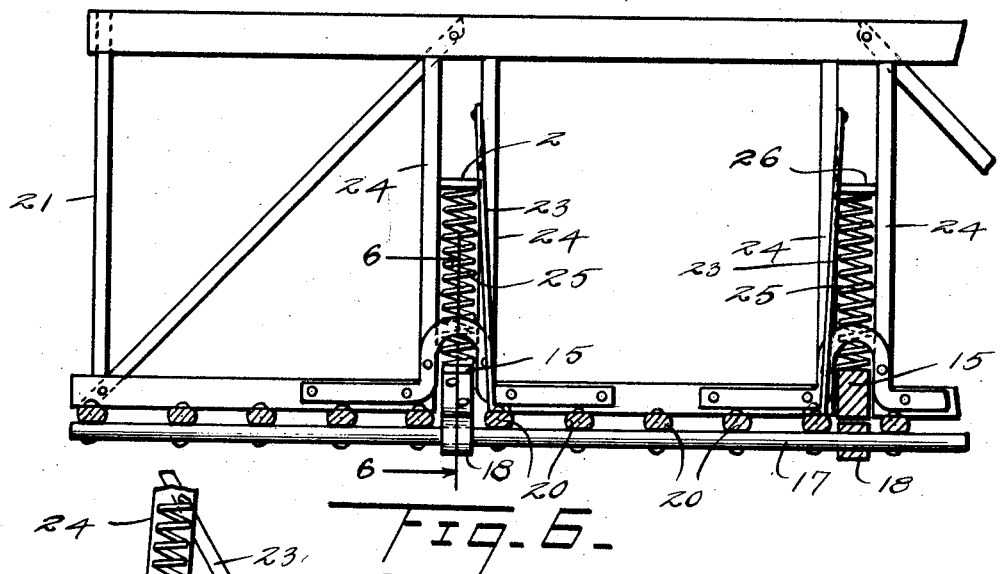
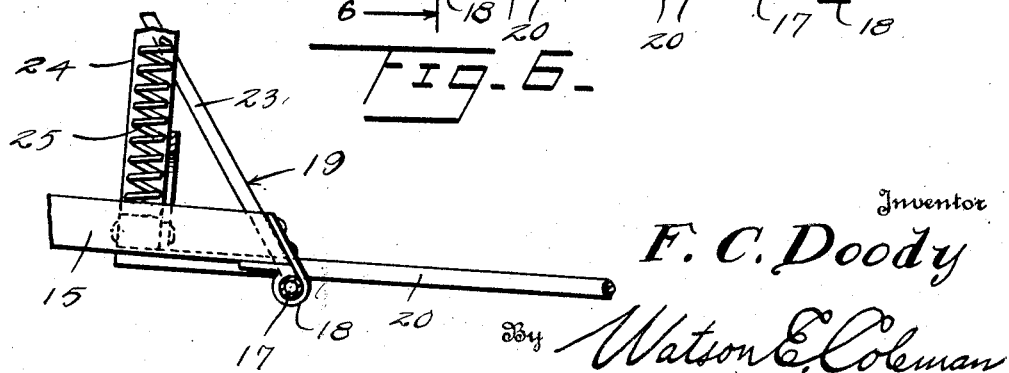

1,886,655

UNITED STATES PATENT OFFICE

FREDERICK C. DOODY, OF ST. ONGE, SOUTH DAKOTA, ASSIGNOR OF ONE-HALF TO THOMAS H. LINDLEY, OF OMAHA, NEBRASKA

TRACTOR SUPPORTED AND OPERATED HAY SWEEP AND STACKER

Application filed August 6, 1931. Serial No. 555,566.

This invention relates to hay sweeps and stackers, and has for one of its objects to provide a novel and simple machine of this character that may be readily mounted on a farm tractor and operated from the power take-off shaft of the tractor.

To attain the foregoing and other objects, the nature of which will appear as the description proceeds, the invention comprehends the provision of a sweep and stacker which shall embody standards, means for supporting the standards from opposite sides of the tractor, a rake, beams having the rake pivoted thereto and normally extending downwardly and forwardly from the standards to support the rake in load gathering position, means supporting the beams from and pivoted to the standards, means for rocking said first means to raise the beams and thus elevate the rake to load discharging position, and means for maintaining the rake in load sustaining position while it is being elevated from load gathering to load discharging position.

The invention further comprehends the provision of a sweep and stacker of the character stated wherein the rake shall be pivoted to the beams and constantly urged when in load gathering position in a downwardly and forwardly inclined direction with respect to the beams so as to maintain the free ends of its tines in contact with the ground and thus insure its gathering all hay in its path.

The invention further comprehends the provision of a sweep and stacker of the character stated wherein the beam supporting means shall embody substantially horizontal and vertical levers pivoted to the upper ends of the standards, links connecting the beams to the front ends of the horizontal levers, and means connecting the beams to the lower ends of the vertical levers.

The invention further comprehends the provision of a hay sweep and stacker of the character stated wherein the means for operating the beam supporting means to effect the elevation of the fork from its load gathering to its load discharging position, shall embody drums journaled on the standards, means for operating the drums from the power take-off shaft of the tractor, cables terminally connected to the drum and to the rear ends of the vertical beams and passing over guide sheaves journaled on the standards and on the rear ends of the horizontal beams.

The invention further comprehends the provision of a sweep and stacker of the character stated wherein the means for maintaining the fork in its load sustaining position while it is being elevated from its load receiving to its load discharging position shall embody a lever pivoted to one of the standards, guide sheaves, means normally holding the lever against movement, and cables terminally connected to the fork and lever and passing about the sheaves, the cables functioning to permit the fork to occupy its load sustaining position while being elevated, and the lever being rocked after the fork reaches its load discharge position to release the fork for downward swinging movement to discharge its load.

The invention further comprehends the provision of a sweep and stacker which shall embody means adapted to so control the clutch of the tractor as to effect the stopping of the tractor when the fork reaches its maximum height.

The invention is hereinafter more fully described and claimed, and illustrated in the accompanying drawings, wherein:

Figure 1 is a view in side elevation of the hay sweep and stacker mounted upon a tractor and with the fork in load gathering position.

Figure 2 is a similar view with the fork in load discharging position.

Figure 3 is a sectional view on an enlarged scale taken on the vertical planes indicated by the line 3—3 of Figure 1.

Figure 4 is a view partly in top plan and partly in horizontal section of the frame and the standards carried thereby.

Figure 5 is a sectional view taken on the plane indicated by the line 5—5 of Figure 1.

Figure 6 is a sectional view taken on the plane indicated by the line 6—6 of Figure 5.

Figure 7 is a sectional view taken on the plane indicated by the line 7—7 of Figure 3, and Figure 8 is a sectional view taken through the clutch of the means for holding the lever against accidental movement.

Referring in detail to the drawings, 1 designates the frame, 2 the propelling wheels, 3 the steering wheels, 4 the rear axle housing, 5 the engine, 6 the power take-off shaft, and 7 the seat of a tractor of well-known construction.

The hay sweep and stacker comprises a frame 8 which consists of side bars 9 and a front cross bar 10 and which supports standards 11. The standards 11 are secured to the side bars at the rear ends of the latter, and are held in upright position on the frame 8 by braces 12. The frame 8 is mounted upon the tractor with its side bars 9 located at the sides of the tractor and with its cross bar 10 extending across the tractor in advance of the steering wheels 3. The frame 8 is located below the frame 1 of the tractor, and is suspended from the frame by brackets 13 and from the rear axle housing 4 by the standards 11. The standards 11 are secured, as at 14, to the axle housing 4, and extend upwardly from the frame 8 to points above the tractor.

Rake carrying beams 15 located at the sides of the tractor, bear against the front sides of the standards 11 near the lower ends of the latter, and extend downwardly from the standards to points forwardly beyond the tractor, when supporting the rake in load gathering position. The beams 15 are provided at their rear ends with upwardly directed hooks 16 which, when the beams are supporting the rake in load gathering position, engage the standard 11 to hold the rear ends of the beams against accidental upward movement.

A shaft 17 extends across the front ends of the beams 15, and is journaled by bearings 18 to the lower sides of the beams. The fork 19 consisting of tines 20 and a back 21, is mounted upon the shaft 17 with its tines extending forwardly and rearwardly beyond the shaft. The fork 19 is secured to the shaft 15 by elements 22 extending through the shaft and the tines 20. The back 21 which is secured to the tines 20, and which is supported in upright position thereon by braces 23, includes pairs of relatively spaced bars 24 which have their lower ends located at opposite sides of the beams 15. Coil springs 25 located between the bars 24, are secured at their upper ends, as at 26, to the bars and bear at their lower ends upon the beams 15. When the fork 19 is in load gathering or sweeping position, the springs 25 constantly tend to turn the fork downwardly and forwardly on the shaft 17 to hold the front ends of the tines 20 in contact with the ground, with the result that the fork will gather all hay in its path.

Levers 27 occupy a substantially upright position in advance of the standards 11 when the beams 15 are supporting the fork 19 in load gathering position. The levers 27 are pivoted between their ends by a shaft 28 to the upper ends of the standards 11, and are pivotally connected at their lower ends, as at 29, to the beams 15 at points near the rear ends of the latter. Levers 30 occupy a substantially horizontal position above the standards 11 when the beams 15 are supporting the fork 19 in load receiving position. The levers 30 extend forwardly and rearwardly beyond the standards 11 and the levers 27, and are fixedly secured to the levers 27 by brackets 31 which function to connect the levers 27 and 30 to the pivot shaft 28.

The levers 30 are connected by links 32 to the beams 15, the links being pivotally connected, as at 33, to the front ends of the levers, and being pivotally connected, as at 34, to the beams near the front ends of the latter. The levers 27 and 30 rockably support the beams 15 from the upper ends of the standards 11, to the end that the beams may be moved from their downwardly and forwardly inclined position, in which they are shown in Figure 1 into the upwardly and forwardly inclined position in which they are shown in Figure 2, and thus raise the fork 19 from its load gathering position into load discharging position.

The means through the medium of which the levers 27 and 30 may be rocked to raise the fork 19 from its load gathering to its load discharging position, comprises a shaft 35 extending between and journaled in the standards 11 and driven from the power take-off shaft 6 of the tractor by a sprocket chain 36 passing about a sprocket pinion 37 fixed to the take-off shaft and a sprocket gear 38 fixed to the shaft 35. The standards 11 are of skeleton formation and journaled therein are drums 39 which are located below the shaft 35 and which are driven therefrom by spur pinions 40 fixed to the shaft and meshing with spur gears 41 fixed to the drums. Arms 42 are secured to and extend rearwardly from the upper ends of the levers 27, and are maintained in right angular relation to the levers by braces 43. A bar 44 extends between and is secured to the arms 42, and is provided with hooks 45. Cables 46 fixed at certain of their ends to the hooks 45, pass about sheaves 47 journaled in the standards 11, pass about sheaves 48 journaled on the rear ends of the levers 30, pass about sheaves 49 journaled in the standards directly opposite the sheaves 47, and have their other terminals fixed to the drums 39.

The cables 46 establish such connection between the drums 39 and the levers 30 that the fork 19 will be raised from its load gathering to its load discharging position as the result of the rotation of the drums. The means for controlling the operation of the power take-off shaft 6, and consequently the rotation of the drums 39, forms a part of the tractor, and is not illustrated as it is well understood by those skilled in the art.

The fork 19 may be raised to any desired height above the ground, the height to which the fork will be raised depending on the height of the stack of the hay upon which the load of the fork is to be deposited. The fork 19 is adapted to be held in its raised or load discharging position by a clutch drum 50 and a brake band 51. The drum 50 is loose on the shaft 35, and is provided with internal teeth 52 for engagement with spring pressed pawls 53 surrounding and pivoted to the shaft. The brake band 51 is secured at one end, as at 54, to one of the standards 11, and is secured at its other end to a lever 55 which is pivoted, as at 56, to this standard. A latch 57 carried by the lever 55 engages a notched sector 57a to hold the lever against accidental movement, the sector being secured to the mentioned standard 11. The lever 55 is located close to the tractor seat 7, so as to be within convenient reach of the operator, and provides means through the medium of which the brake band 51 may be tightened about the clutch drums 50. When the brake band 51 is tightened about the clutch drums 50, the shaft 35 is held against rotation in a direction that would permit the fork 19 to move from its load discharging to its load gathering position.

During its movement from load gathering to load discharging position, the fork 19 is held in load sustaining position with its tines 20 substantially horizontal. The fork 19 is held in this position through the medium of cables 58 secured to the upper edge of the fork back 21, passing about sheaves 60 journaled on the lower ends of the levers 27, and passing about sheaves 60a journaled in the upper ends of the standards 11, sheave 60b journaled in the standards 11 in a position downwardly from the sheave 60a, and sheave 60c journaled adjacent one end of the lever 30. The cables 58 also pass about sheaves 60d carried by the lever 30 intermediate its ends and the cables 58 have an end attached to a releasing lever 58a which is pivoted to one of the standards 11, and provided with suitable releasable locking means 58b.

An automatic clutch operating cable 61 is attached at one end to the lever 27 and is passed about suitable sheaves and connected at the opposite end to the clutch lever 62, so that when the lever 27 at the forward end reaches its maximum height or a predetermined height, the forward movement of the tractor will be arrested and the fork 19 will be held stationary in its load discharging position until released by releasing of the lever 58a. When the clutch lever 62 is held in released or declutched position, the transmission gears can be manually shifted to reverse, so that a lowering of the fork 19 for discharge of the load, and consequent release of the brake drum 50 and lowering of the lever 27 will not only effect discharge of the load from the fork 19 when the lever 58a is released, but will automatically operate to permit the clutch lever 62 to move into clutched position and automatically effect reversal of the tractor and withdrawal of the haystacker or loader from the stack. It will, therefore, be seen that the operation of the loader is generally as follows:

After the load has been picked up by moving the fork 19 forwardly over the ground, the fork 19 may be raised slightly through operation of the raising mechanism. When the desired point of discharge has been reached, the fork 19 is raised to its maximum or a predetermined height and this raising movement will automatically stop the movement forwardly of the tractor through movement of the lever 62 into released position. Before lowering of the raising means for the fork 19, and either before or after the fork 19 has been swung into discharging position, the transmission gears may be shifted to reverse placing the tractor in a position to be automatically reversed upon lowering of the lever 27.

In practice, the hay sweep and stacker is moved over the field with its fork 19 in load gathering position. As the front ends of the tines are held in contact with the ground by the springs 25, the fork 19 will gather all hay in its path. After the fork 19 has gathered its load, the hay sweep and stacker is moved in the direction of the stack with the fork in contact with the ground. Just before the stack has been reached, the power take-off shaft 6 is connected to its driving gear of the tractor to effect the rotation of the drums 39. The rotation of the drums 39 winds the cables 46 thereon, with the result that the levers 27 and 30 are rocked upwardly and rearwardly about their pivot 28. This movement of the levers 27 and 30 carries the beams 15 bodily into an upwarly and forwardly inclined position above the tractor, resulting in the raising of the fork 19.

While being elevated, the fork 19 is held in load sustaining position by the cables 58. After the fork 19 has been raised, the brake band 51 is tightened about the clutch drum 50 to support it in raised position, and it is released by the cables 58 so as to permit the weight of its load to swing it downwardly and forwardly on the shaft 17 into load discharging position. On the raising of the fork 19, the cable 61 pulls the lever 62 in a direction to throw out the clutch of the tractor with the result that the tractor is stopped. After the fork 19 has discharged its load onto the stack, the clutch drum 50 is released so as to permit the levers 27 and 30 to move downwardly and forwardly on their pivot 48, and thus carry the beams 15 into their normal position and the fork 19 into its load gathering position.

This movement of the levers 27 and 30 also releases the clutch lever 62 with the result that the tractor may be backed away from the stack and then thereafter moved forwardly over the field to gather another load in the fork 19. When the fork 19 is in load gathering position, the beams 15 contact at their rear ends with the front sides of the standards 11. It will thus be seen that the standards 11 constitute means for limiting the downward and forward movement of the levers 27 and 30 and function to attain this end when the beams 15 reach their lower or that position thereof where they support the fork 19 in load receiving position.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. A hay sweep and stacker, comprising beams, first and second angularly related levers intersecting each other at points between their ends, means securing the beams to one end of said first lever, links securing the beams to one end of said second lever, a drum, means for rotatably supporting the drum, means for rotating the drum, guide sheaves secured to said supporting means and to the other end of said second lever, a cable terminally secured to the drum and to the other end of said first lever and passing about the sheaves, a fork mounted on the beams for movement into load gathering position when the beams are lowered and for movement into load discharging position when the beams are raised, and fork controlling means.

2. A hay sweep and stacker, comprising standards, angularly related first and second pairs of levers, the levers of each pair crossing each other at points between their ends, means securing the levers of each pair together and for pivotally securing them to the standards, means securing the beams to corresponding ends of the levers of said first pair, links connecting the beams to corresponding ends of the levers of said second pair, the levers being adapted to be rocked to raise and lower the beams and the beams being adapted to contact with the standards when in lowered position, drums journaled on the standards, means for operating the drums, guide sheaves mounted on the standards and on the other ends of said second pair of levers, cables terminally secured to the drum and to the other end of said first pair of levers and passing about the sheaves, a fork mounted on the beams for movement into load gathering position when the beams are lowered and for movement into load discharging position when the beams are raised, and fork controlling means.

3. A hay sweep and stacker comprising a wheel supported frame, a second frame, means suspending said second frame from said first frame, standards secured to said second frame, angularly related first and second pairs of levers, the levers of each pair crossing each other at points between their ends, means securing the levers of each pair together and for pivotally securing them to the standards, means securing the beams to corresponding ends of the levers of said first pair, links connecting the beams to corresponding ends of the levers of said second pair, the levers being adapted to be rocked to raise and lower the beams and the beams being adapted to contact with the standards when in lowered position, drums journaled on the standards, means for operating the drums, guide sheaves mounted on the standards and on the other ends of said second pair of levers, cables terminally secured to the drum and to the other end of said first pair of levers and passing about the sheaves, a fork mounted on the beams for movement into load gathering position when the beams are lowered and for movement into load discharging position when the beams are raised, and fork controlling means.

4. A hay sweep and stacker comprising an upright, means for mounting the upright on a tractor frame, a pair of intersecting levers pivotally carried by the upright, a beam, means for pivotally securing one end portion of the beam to one of the levers, a link having one end pivoted to one end of the other lever, means for pivotally securing the other end of the link to the beam adjacent the other end of the beam, a fork swingably carried by the other end of the beam, means for swinging the other end of the levers toward the upright whereby to bodily raise or lower the beam, and operating means for the fork.

In testimony whereof I hereunto affix my signature.

FREDERICK C. DOODY.